W. D. EWART.
LINKS FOR DRIVE CHAINS.

No. 188,117. Patented March 6, 1877.

William D. Ewart,
Inventor.

Witnesses:
Heinrich F. Bruns.
L. M. Harris.

By Coburn & Thacher
Attys.

UNITED STATES PATENT OFFICE.

WILLIAM D. EWART, OF CHICAGO, ILLINOIS, ASSIGNOR TO EWART MANUFACTURING COMPANY, OF SAME PLACE.

IMPROVEMENT IN LINKS FOR DRIVE-CHAINS.

Specification forming part of Letters Patent No. 188,117, dated March 6, 1877; application filed January 15, 1876.

*To all whom it may concern:*

Be it known that I, WILLIAM DANA EWART, of Chicago, in the county of Cook and State of Illinois, have invented new and useful Improvement in Links for Drive-Chains, which is fully described in the following specification, reference being had to the accompanying drawing, in which—

Figure 1:
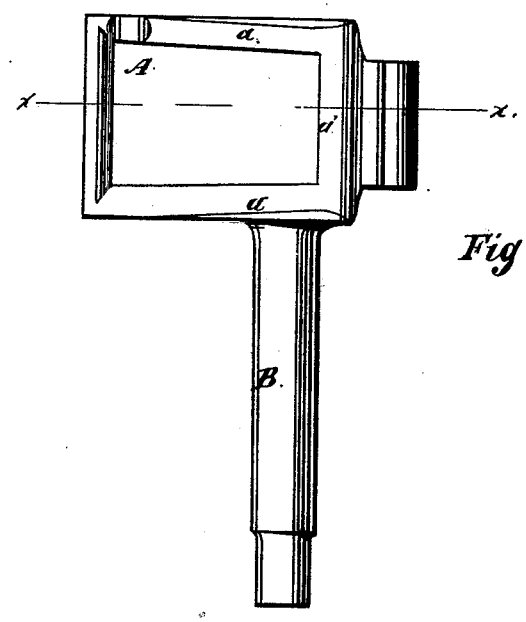
Figure 2:
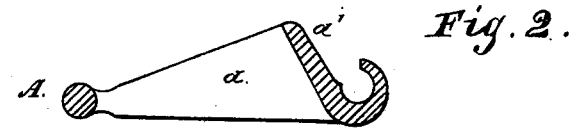

Figure 1 is a plan view of the link and attachment; and Fig. 2, a sectional view on the line $x\ x$, Fig. 1.

The object of this invention is to adapt my detachable link patented September 1, 1874, and reissued April 20, 1875, No. 6,387, for use in driving harvester-rakes—such, for instance, as that generally known as the Wood rake, in which the rake is attached to and carried along by a driving-chain.

My invention consists in casting the rake-pin—that is, the pin by means of which the rake is attached to the chain—in one piece with the link.

In the drawing, A represents my link, of ordinary construction, except that the sides and one end are enlarged, as seen at $a\ a'$, to give strength to the link and a suitable support to the pin B, which is cast upon one side of the link, and in one piece therewith, as clearly shown in the drawing.

This link provided with the pin is placed in a chain composed of my ordinary links. The pin is inserted in a suitable socket in the rake-head, or some other part of the raking apparatus, and the rake is thus attached to the chain and is carried along with it; at the same time the link is left open, so that the sprockets upon the driving-wheels operate upon it the same as upon the other links of the chain.

Having thus described my invention, what I claim as new, and desire to secure by Letters Patent, is—

1. The link A, having a central open space, and constructed with side bars gradually increasing in size toward the hook end of the link, and with the end bar at that end enlarged and inclined backward, substantially as and for the purpose set forth.

2. The link A, having a central open space, and constructed with enlarged bars, as described, in combination with a rake-pin, B, cast in one piece therewith, substantially as and for the purpose set forth.

WILLIAM DANA EWART.

Witnesses:
    H. C. WHITNEY,
    HEINRICH F. BRUNS.